April 16, 1929.  W. R. BENDY  1,709,109

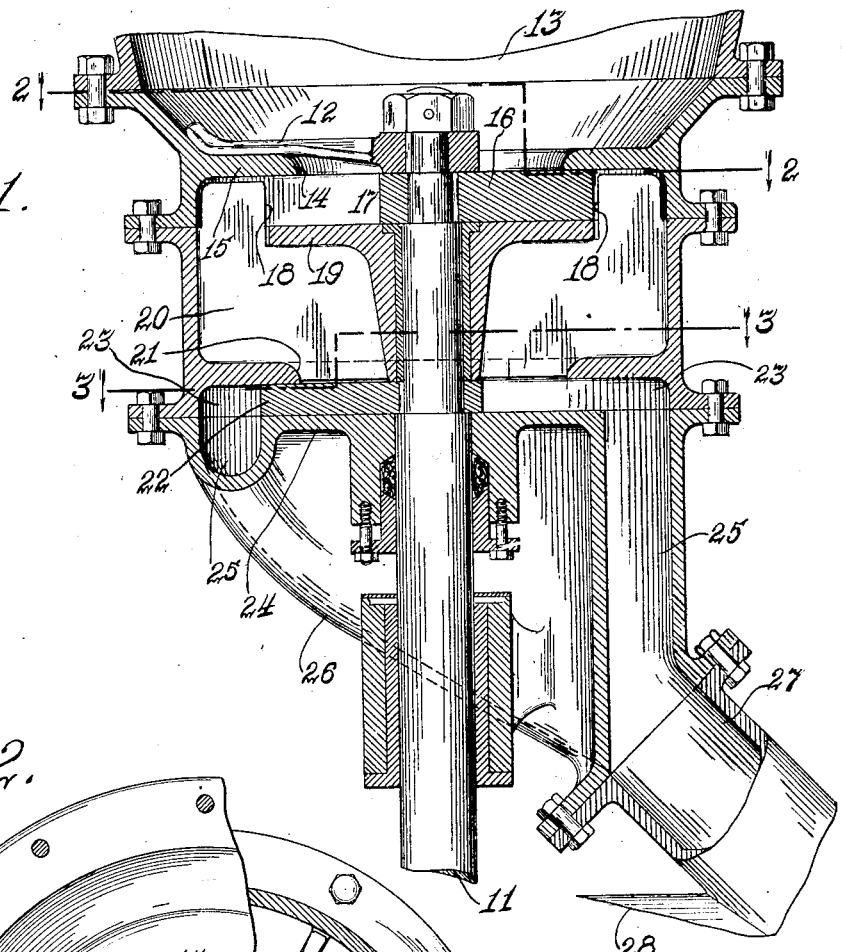
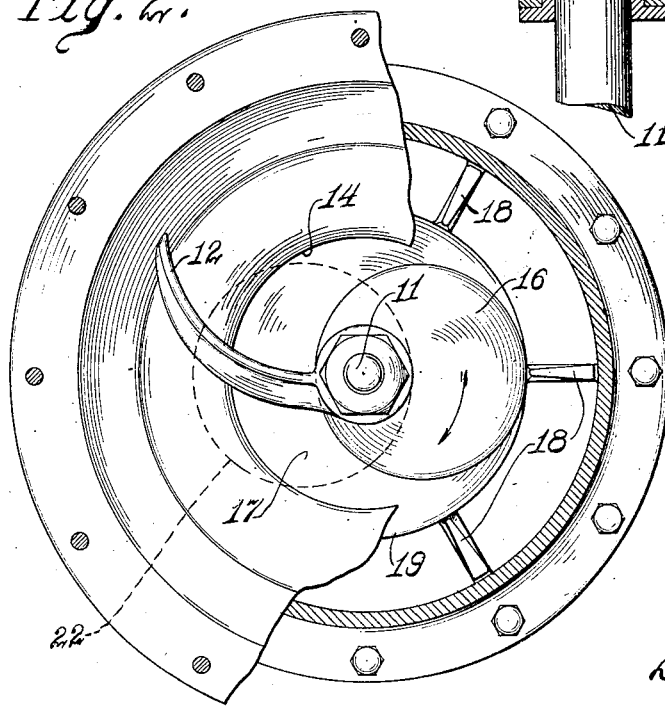

FEED MECHANISM

Filed July 19, 1927  2 Sheets-Sheet 2

Inventor
Wilfred R. Bendy
Daniel J. Brennan
Attorney

Patented Apr. 16, 1929.

1,709,109

UNITED STATES PATENT OFFICE.

WILFRED R. BENDY, OF CHICAGO, ILLINOIS.

FEED MECHANISM.

Application filed July 19, 1927. Serial No. 207,006.

My invention relates to improvements in feeding mechanisms especially adapted for feeding and measuring pulverized materials, such as powdered coal, raw dried material of Portland cement, Portland cement, hydrated lime and the like, and has for its primary object the provision of a simple and efficient improved mechanism of the character indicated.
Another object of the invention is to provide improved means for continuously and regularly feeding purverized materials.

Another object of the invention is the provision of feeding mechanism capable of feeding such materials against an air pressure in such manner that the material forms its own seal and prevents the blowing back of air or the escape of the pressure.

Another object of the invention is the provision of improved feeding mechanism of the character indicated adapted and arranged to feed a constant measured volume of material substantially independently of any arching, blocking or clogging action which may take place in the bin or hopper from which the material is being fed.

Another object of the invention is to provide an improved feeder of the class indicated which is capable of preventing flooding or undue feeding of material at any time.

Another object of the invention is to provide an improved apparatus combining the functions of a meter and feeder in one mechanism so that the operation of the feeder will be an accurate measure of the material delivered at all times.

Other objects will appear hereinafter.

The invention consists in the combinations and arrangements of parts hereinafter described and claimed.

The invention will be best understood by reference to the accompanying drawings forming a part of this specification and in which—

Figure 3:
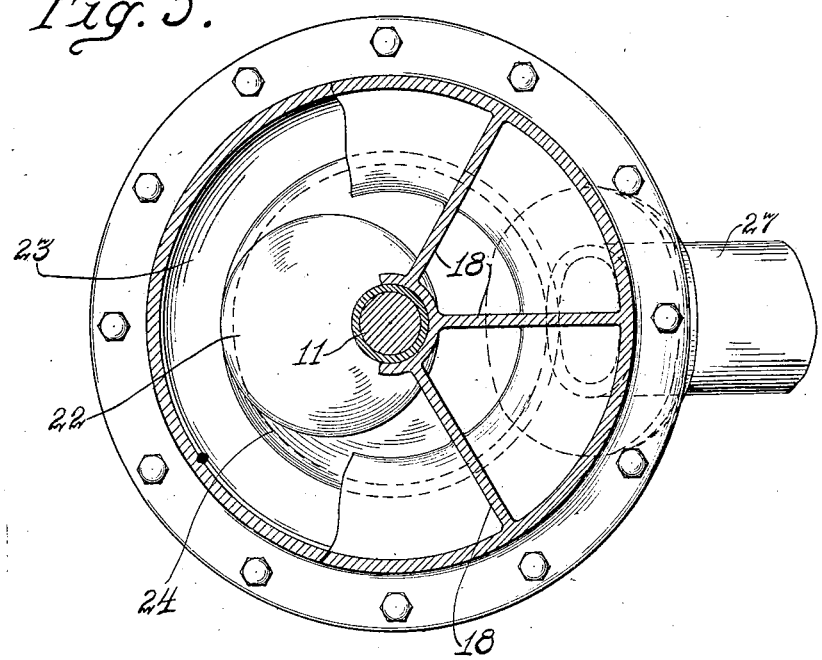

Fig. 1 is a vertical section taken through feeding mechanism embodying the invention;

Fig. 2 a horizontal section taken substantially on line 2—2 of Fig. 1;

Fig. 3 a horizontal section taken substantially on line 3—3 of Fig. 1; and

Figure 4:
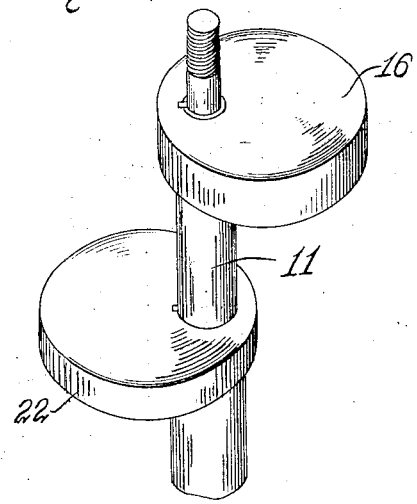

Fig. 4 a perspective view of an operating or feeder shaft employed in the construction.
The preferred form of construction as illustrated in the drawings comprises a constantly rotating vertical shaft 11 mounted in suitable bearings, not shown, and provided at its upper end with a stirring or agitating arm 12 revolving in the bottom of a feed hopper 13 adapted and arranged to contain the material to be fed. The upper end of the shaft 11 projects upwardly through a central opening 14 in the bottom 15 of the hopper 13, the agitator arm 12 revolving immediately above said bottom, as shown.

A discharge chamber 17 is located immediately under the hopper 13 and communicating therewith through the opening 14, said chamber being provided with a plurality of radiating blades or vanes 18 dividing said chamber into a plurality of radiating compartments, as shown.

Arranged within the chamber 17 and formed integral with the vanes 18 is a shelf 19 positioned immediately below the opening 14 leaving a space, however, as shown, for the accommodation of a disk 16 mounted eccentrically on the upper end of shaft 11 and revolving in said space. As best indicated in Fig. 2, this arrangement leaves a crescent-shape discharge opening at the bottom of hopper 13 through which the material in hopper 13 will pass onto the shelf 19, and the disk 16 revolving over said shelf will constantly push said material radially from said shelf into the compartments 20 between the vanes 18.

The chamber 20 is provided at its bottom with a central discharge opening 21, and a second eccentric revolving disk 22 is mounted on the shaft 11 opposite the disk 16 and immediately under the opening 21. An annular space 23 is provided around the periphery of the revolving disk 22, and a shelf 24 is provided, as shown, immediately under said disk and the opening 21 to receive the material from chamber 20.

As indicated, the disk 22 is of less height than the disk 16, and has less volumetric capacity, and will, therefore, displace a smaller volume at each revolution. The disk 22 operates in precisely the same manner as the disk 16 but, being of less volumetric capacity will cause the material to accumulate and compact in the chamber 20 until the weight of material compacting into the volume displaced by the revolution of disk 22 equals the volume of the loose material displaced by the revolution of the disk 16. This compacting of the material in chamber 20 prevents the backflow of air or other gas under pressure through the feeding mechanism. Likewise the placing of the disks 16 and 22 on opposite sides of the shaft 11 and the presence of the vanes 18 prevents any direct communication and passage of air backward through the apparatus.

An annular discharge chamber 25 is arranged under the space 23, said chamber 25 being provided with an inclined bottom 26 directing material therein to a discharge spout 27 located at the lowest point in chamber 25. The discharge spout 27 communicates with a pipe 28 constituting the feed pipe or compressed air line for feeding material such as powdered coal and the raw dried material of Portland cement into the air conveying system, such as is used to transport pulverized materials considerable distances by the agency of compressed air in ordinary cement factories or kilns. Such a pipe always contains air at low pressure and such air has a tendency to escape through any feeding mechanism employed for ejecting material such as powdered coal thereinto.

The feeding mechanism disclosed will feed and at the same time accurately measure pulverized material such as powdered coal into such a pipe containing air pressure without permitting escape of the air through the feeding mechanism. This is due to the fact that the material itself is compacted in the chamber 20 and forms itself an air seal preventing the escape of such air.

The specific form and arrangement of parts constitutes a simple and effective one for the purpose.

While I have illustrated and described the preferred form of construction for carrying my invention into effect, this is capable of variation and modification without departing from the spirit of the invention. I, therefore, do not wish to be limited to the precise details disclosed but desire to avail myself of such variations and modifications as fall within the scope of the appended claims.

I claim:

1. Feeding mechanism comprising a hopper; a discharge chamber associated therewith; transferring means for transferring material from said hopper to said chamber; and transferring means of less volumetric capacity for transferring material from said chamber.

2. Feeding mechanism comprising a hopper; a pipe under pressure; a discharge chamber associated with said hopper and said pipe; transferring means for transferring material from said hopper to said chamber; and transferring means of less volumetric capacity for transferring material from said chamber to said pipe.

3. Feeding mechanism comprising a hopper; a pipe under pressure; a discharge chamber located under said hopper and connected with said pipe; transferring means for transferring material from said hopper to said chamber; and transferring means of less volumetric capacity for transferring material from said chamber to said pipe.

4. Feeding mechanism comprising a hopper; a discharge chamber located under said hopper, there being openings in the bottoms of said hopper and chamber; shelves under each of said openings; a vertical shaft revolving in said chamber; and disks eccentrically mounted on said shaft and revolving, respectively, above said shelves and under said openings, the lower disk having less volumetric capacity than the upper disk.

5. Feeding mechanism comprising a hopper; a discharge chamber located under said hopper, there being openings in the bottoms of said hopper and chamber; shelves under each of said openings; a vertical shaft revolving in said chamber; disks eccentrically mounted on said shaft and revolving, respectively, above said shelves and under said openings; and radial partitions in said chamber.

6. Feeding mechanism comprising a hopper; a discharge chamber located under said hopper, there being openings in the bottoms of said hopper and chamber; shelves under each of said openings; a vertical shaft revolving in said chamber; disks eccentrically mounted on said shaft and revolving, respectively, above said shelves and under said openings, the lower disk having less volumetric capacity than the upper disk; and radial partitions in said chamber.

7. Feeding mechanism comprising a hopper; a discharge chamber located under said hopper, there being openings in the bottoms of said hopper and chamber; shelves under each of said openings; a vertical shaft revolving in said chamber; disks eccentrically mounted and oppositely positioned on said shaft and revolving, respectively, above said shelves and under said openings, the lower disk having less volumetric capacity than the upper disk; and radial partitions in said chamber.

8. The combination with a pipe under pressure of means for feeding material into said pipe; and means for compacting and forming said material into a seal to prevent escape of pressure from said pipe.

In testimony whereof I affix my signature at 10 South La Salle Street, Chicago, Illinois.

WILFRED R. BENDY.